2,971,887
INHIBITION OF ISONIAZID ACETYLATION

Willard J. Johnson, Montreal, Quebec, Canada, assignor to Frank W. Horner, Limited, Montreal, Quebec, Canada, a corporation of Canada No Drawing. Filed Dec. 3, 1956, Ser. No. 625,622

Claims priority, application Canada May 30, 1956

6 Claims. (Cl. 167—65)

This invention relates to a therapeutic composition and more particularly to a therapeutic composition including isoniazid and an acetylation inhibitor.

In applicant's copending United States application 452,227, filed August 25, 1954, now abandoned, for an invention of Willard Johnson entitled "Therapeutic Composition Including Acetylation Inhibitor" of which this application is a continuation in part, it was explained that the acetylation of sulfonamides with consequent inactivation and loss of the sulfonamides and possibilities of kidney damage could be inhibited by administering with the sulfonamides a substance which would compete with the sulfonamides for the acetylating enzyme. The inhibition thus caused tends to reduce the danger of kidney damage and, by reducing the rate of urinary excretion makes possible the maintenance of therapeutic blood levels of free sulfonamide at lower dosage levels and with less frequent administration than was hitherto the case. It was also disclosed that the acetylation inhibitors inhibited the acetylation of isoniazid.

The inhibition of the acetylation of isoniazid provides a means of attaining greater effectiveness of a given dose of isoniazid by the use of inhibitors of isoniazid acetylation to prevent the inactivation and rapid excretion of the drug. The inhibitors of isoniazid acetylation are able to produce elevated and sustained blood plasma levels of free, therapeutically active isoniazid, thus obviating the necessity of giving increased dosages to obtain higher blood levels of isoniazid. The instant application further develops the use of applicant's invention in the acetylation of isoniazid.

Isoniazid, as an anti-microbial drug, is considered to be equivalent if not superior to streptomycin in the treatment of pulmonary tuberculosis. However it has been shown by Hughes, J. Pharmacol. & Exper. Therap., 109: 444 (1935), and confirmed by others: Nature, 173: 36 (1954), that when isoniazid is administered to man and monkey, from 50% to 90% of the drug appears in the urine in the acetylated form, that is, as 1-isonicotinyl-2-acetylhydrazine.

Acetyl-isoniazid has less than one five-hundredth the activity of free isoniazid against the tubercle bacillus in vitro, while in vivo the parent drug is at least 100 times more active than the acetyl derivative (3). Moreover, as is known to be the case with sulfonamides, the acetyl-derivative is excreted via the kidney at a much greater rate than is the free drug. Thus, acetylation of isoniazid by the liver leads to rapid inactivation and excretion of the drug, which to some extent accounts for the rapid drop in isoniazid blood levels after the peak blood level has been reached. The over-all effect of acetylation is in all probability a diminution in the therapeutic effectiveness of the administered drug.

Both isoniazid and sulfonamides are acetylated by the same enzyme system which is located in the liver of birds and mammals (including man). The dual acetylation of isoniazid and sulfanilamide is illustrated by the experiment shown in Table I. Isoniazid and sulfanilamide, separately and in combination, were incubated with a cell-free extract of pigeon liver under conditions suitable for acetylation to take place. When 2.92 micromoles of isoniazid and 2.61 micromoles of sulfanilamide were incubated separately with the liver extract, 1.51 micromoles of isoniazid and 0.90 micromole of sulfanilamide were acetylated. When the same amounts of isoniazid and sulfanilamide were incubated in combination, only 1.05 micromoles of isoniazid and 0.30 micromole of sulfanilamide were acetylated; that is, a reduction in acetylation of 30% and 68% respectively. This indicates that isoniazid and sulfanilamide compete for the same enzyme. Therefore, inhibitors of sulfanilamide acetylation will inhibit, also, the acetylation of isoniazid.

TABLE I

Competition of isoniazid (INH) and sulfanilamide for the same acetylating enzyme in pigeon liver extract

| Additions | INH acetylated, µM | Inhibition of INH acetylation, Percent | Sulfanilamide acetylated, µM | Inhibition of sulfanilamide acetylation, Percent |
|---|---|---|---|---|
| INH | 1.51 | | | |
| Sulfanilamide | | | 0.90 | |
| INH, Sulfanilamide | 1.05 | 30 | 0.30 | 68 |

Vessel components: 1 ml. of pigeon liver extract; 60 µM potassium phosphate buffer (pH 7.4); 60 µM acetate; 60 µM citrate; 9 µM ATP; 2.92 µM INH; 2.61 µM sulfanilamide. Total volume 3 ml..; 90 minutes incubation at 37° C.

The inhibitors used in accordance with this invention are soluble, non-toxic compounds selected from the group having the general formula

R—A where R is at least one member selected from the group consisting of hydrogen, halogen, hydroxyl, amino, lower alkyl radicals having not more than three carbon atoms, phenyl, and carboxyl, and where A is selected from the group consisting of pyridine, benzamide, benzoic acid hydrazide, and benzoylhydroxamic acid, and pharmaceutically acceptable salts thereof.

A cell-free extract of pigeon liver was employed for testing the inhibitory effect of various compounds on isoniazid acetylation. The compounds which were shown to be particularly effective were p-aminosalicylamide, N¹,N¹-diethylsulfanilamide and gentisamide. P-aminosalicyclic acid is also, as shown by experiments with rabbits, an effective acetylation inhibitor when used in the ratio of 1/10 to 1/12 of isoniazid to para-aminosalicylic acid. The results obtained in the in vitro experiments are reproduced below in Table II.

TABLE II

*Inhibition of isoniazid (INH) acetylation in vitro [1]*

| Inhibitor | Concentration of inhibitor, moles/litre | Percent inhibition of acetylation |
|---|---|---|
| 5-Bromosalicylamide [2] | $1.3 \times 10^{-4}$ | 52 |
| Salicylamide [2] | $5 \times 10^{-4}$ | 24 |
|  | $10^{-3}$ | 36 |
| o-Cresotamide | $2 \times 10^{-3}$ | 58 |
|  | $10^{-3}$ | 36 |
| Gentisamide | $2.5 \times 10^{-4}$ | 54 |
|  | $4 \times 10^{-4}$ | 74 |
| p-hydroxybenzamide [2] | $10^{-3}$ | 22 |
| Gallic Acid Amide | $8 \times 10^{-4}$ | 29 |
| p-Aminosalicylic Acid [2] | $10^{-3}$ | 49 |
| p-Aminosalicylamide | $10^{-3}$ | 86 |
| o-Hydroxybenzal isonicotinyl hydrazone | $5$ | 70 |
| p-Aminobenzoic Acid | $10^{-3}$ | 41 |
| 6-Aminonicotinamide [2] | $10^{-3}$ | 50 |
| p-Aminophenylacetic Acid | $2 \times 10^{-3}$ | 36 |
| 4-Amino-5-imidazolecarboxamide | $2 \times 10^{-3}$ | 31 |
| Pyrazinamide [2] | $8 \times 10^{-4}$ | 19 |
|  | $10^{-4}$ | 41 |
| $N^1,N^1$-Diethylsulfanilamide | $2 \times 10^{-4}$ | 74 |
|  | $4 \times 10^{-4}$ | 31 |
| Sulfamethylthiadiazole | $8 \times 10^{-4}$ | 54 |
| Sulfamethazine | $8 \times 10^{-4}$ | 16 |
| Sulfacetamide | $8 \times 10^{-4}$ | 13 |
| Sulfanilamide [3] | $9 \times 10^{-4}$ | 30 |
| 1-Hydrazinophthalazine | $2 \times 10^{-3}$ | 53 |

[1] Pigeon liver acetylating system (see W. Johnson, Canad. J. Biochem. Physiol. 33:107 1955). The INH concentration was $8 \times 10^{-4}$M. unless otherwise indicated.
[2] In these experiments the INH concentration was $7.75 \times 10^{-4}$M.
[3] INH concentration in this experiment: $9.7 \times 10^{-4}$M.

Table III shows 2 experiments in which sodium PAS was employed as an inhibitor of isoniazid acetylation.

In the first experiment 2 rabbits, each weighing 6 kg., were given 300 mg. of isoniazid by stomach tube. Forty-eight hours later the same rabbits were given 300 mg. of isoniazid plus 3 g. of sodium PAS. Blood plasma levels of free isoniazid were determined at intervals of 1¼, 2¼ and 4 hours after dosage. In both rabbits the administration of PAS with isoniazid resulted in an enhanced plasma level of free isoniazid. This effect of PAS was most striking at the four-hour interval, when the plasma level of free isoniazid was more than twofold that of the control level. A similar effect of PAS is shown in Experiment 2 of Table III.

It should be mentioned that 24 hours after the administration of a single dose of isoniazid there is no detectable sign of the drug in the bloodstream, and hence no carry-over of isoniazid from one experiment to the next. As an extra precaution the order of drug administration was reversed; that is, isoniazid alone was given 48 hours after the dose of isoniazid plus PAS.

Experiments were performed to ascertain the relationship between the dose level of PAS and the plasma level of free isoniazid. The same three rabbits were used throughout this set of experiments. The isoniazid dose was kept constant at 50 mg. per kg. body weight and the sodium PAS dose was varied from 0 to 600 mg. per kg. body weight. That is, the isoniazid to sodium PAS ratio, on a weight basis, varied from 1:0 to 1:12. Typical results are shown in Table IV. It can be seen that there is a progressive increase in the plasma level of free isoniazid at the 1¼ hr. and 4 hr. intervals as the dose of sodium PAS is increased. Thus, when isoniazid and sodium PAS were administered in the ratio of 1:12 the plasma level of free isoniazid was 209% of the level attained when isoniazid alone was given.

TABLE III

*Effect of p-aminosalicyclic acid (sodium) on blood plasma levels of free isoniazid (INH) in rabbits following a single oral dose*

| Expt. No. | Rabbit No. | Weight, kg. | Drug Dose (mg./kg. body wt.) | Blood Plasma Levels of Free Isoniazid | | | | | |
|---|---|---|---|---|---|---|---|---|---|
| | | | | 1¼ hours | | 2¼ hours | | 4 hours | |
| | | | | mg., percent | Percent of control | mg., percent | Percent of control | mg., percent | Percent of control |
| 1 | 1 | 6 | Control (INH50) | 4.8 | | 2.4 | | 1.4 | |
| | | | INH50+PAS (Sodium) 500 | 6.3 | 131 | 5.2 | 217 | 2.9 | 207 |
| | 2 | 6 | Control (INH50) | 3.1 | | 2.1 | | 1.1 | |
| | | | INH50+PAS (Sodium) 500 | 4.9 | 126 | 3.4 | 162 | 2.4 | 218 |
| 2 | 3 | 3 | Control (INH50) | 1.58 | | | | 0.22 | |
| | | | INH50+PAS (Sodium) 600 | 2.76 | 111 | | | 1.4 | 636 |
| | 4 | 3 | Control (INH50) | 2.24 | | | | 0.64 | |
| | | | INH50+PAS (Sodium) 600 | 2.86 | 128 | | | 1.86 | 290 |

TABLE IV

*Effect of increasing doses of sodium PAS on the blood plasma levels of free isoniazid in rabbits [1]*

| Expt. No. | Dosage, mg./kg /body wt. | | INH/Sodium PAS ratio | Blood plasma levels (mg percent) of free isoniazid [2] at intervals, after dosage of— | | Percent Increase of free isoniazid plasma level at 4 hour interval |
|---|---|---|---|---|---|---|
| | INH | sodium PAS | | 1¼ hours | 4 hours | |
| 1 | 50 | 0 | 1.0 | 1.75 | 0.45 | |
| 2 | 50 | 50 | 1.1 | 1.97 | 0.67 | 49 |
| 3 | 50 | 250 | 1.5 | 2.45 | 0.86 | 91 |
| 4 | 50 | 600 | 1.12 | 2.63 | 1.39 | 209 |

[1] The same 3 rabbits, each weighing 3 kg., were used for every experiment.
[2] Free isoniazid blood plasma levels as shown are average values for the group of 3 rabbits.

It has been verified by clinical tests on tuberculous patients that in 23 of 25 patients who received both isoniazid and sodium paraaminosalicylate a detectable increase in isoniazid blood level occurred (Mandel et al., Proc. Soc. Exp. Biol. and Med., 91, 409, 1956).

In order to develop the full advantages of this invention where the acetylation inhibitor is p-aminosalicylamide, a ratio of isoniazid to p-aminosalicylamide of between 1:5 and 1:15 should be maintained. A suitable dose for an adult would be a tablet containing as its active ingredients 50 mg. isoniazid and 500 mg. p-aminosalicylamide, to be administered several times daily.

Table V which is based on data reported by Mandel et al. gives the results of clinical testing of the invention and demonstrates its safety and effectiveness.

TABLE V

| Subject+amount of acetylation inhibitor given with test dose and 3 hours later | Time of determination after test dose of isoniazid of 4 mg. per kg. body weight | Antimicrobially active isoniazid | | | |
|---|---|---|---|---|---|
| | | Serum level | | | |
| | | INH alone, μg. per mg. | INH+ PAS, μg. per mg. | INH+ PABA, μg. per mg. | INH+ PAS-amide |
| 1 (2.5 gms.) | 3 | 0.8 | 1.6 | 1.6 | 3.2 |
| | 6 | 0.4 | 0.4 | 0.8 | 1.6 |
| 2 (2.5 gms.) | 3 | 0.8 | 0.8 | 0.8 | >3.2 |
| | 6 | 0.2 | 0.4 | 1.6 | 0.8 |
| 3 (2.5 gms.) | 3 | 0.8 | 1.2 | 1.6 | 2.4 |
| | 6 | 0.2 | 0.4 | 1.6 | 1.6 |
| 4 (2.5 gms.) | 3 | 0.6 | 0.8 | 2.4 | 3.2 |
| | 6 | 0.2 | 0.2 | 0.6 | 0.8 |
| 5 (5 gms.) | 3 | 0.8 | 2.4 | 3.2 | 3.2 |
| | 6 | 0.4 | 0.6 | 3.2 | 1.6 |
| 6 (2.5 gms.) | 6 hrs | <0.4 | 1.2 | >1.6 | 1.6 |
| 7 (2.5 gms.) | 6 hrs | 0.2 | | 0.4 | 0.8 |
| 8 (2.5 gms.) | 6 hrs | 0.2 | | 0.6 | 1.6 |
| 9 (5 gms.) | 3 hrs | 0.8 | 2.4 | 3.2 | |
| | 6 hrs | 0.4 | 0.6 | 3.2 | |
| 10 (2.5 gms.) | 3 hrs | 0.6 | 0.8 | 2.4 | |
| | 6 hrs | 0.2 | 0.2 | 0.6 | |
| 11 (5 gms.) | 6 hrs | 0.4 | 0.4 | 1.2 | |
| 12 (5 gms.) | 6 hrs | 0.4 | 0.8 | 1.6 | |
| 13 (2.5 gms.) | 6 hrs | 0.2 | 0.2 | 0.4 | |
| 14 (2.5 gms.) | 6 hrs | 0.4 | | 1.6 | |

In the above table INH refers to isoniazid, PAS to para-amino salicylic acid, PABA to para-aminobenzoic acid and PAS-amide to p-aminosalicylamide.

The embodiments of the invention in which an exclusive property or privilege is claimed are defined as follows:

1. A therapeutic composition comprising, as its active ingredients, isoniazid and an acetylation inhibitor consisting of a soluble organic compound selected from compounds having the general formula:

R—A where R is at least one member selected from the group consisting of hydrogen, halogen, hydroxyl, amino, lower alkyl radicals having not more than three carbon atoms, phenyl and carboxyl, and where A is selected from the group consisting of pyridine, benzamide, benzoic acid hydrazide, and benzoylhydroxamic acid, and pharmaceutically acceptable salts thereof.

2. A therapeutic composition comprising as its active ingredients isoniazid and o-hydroxybenzalisonicotinyl hydrazone.

3. A therapeutic composition comprising as its active ingredients isoniazid and 5-bromosalicylamide.

4. A therapeutic composition comprising as its active ingredients isoniazid and p-aminosalicylamide in a ratio of between 1:5 and 1:15.

5. A therapeutic composition comprising as its active ingredients isoniazid and gentisamide.

6. A therapeutic composition comprising as its active ingredients isoniazid and a substance selected from the group consisting of P-aminobenzoic acid and the non-toxic salts thereof.

References Cited in the file of this patent

UNITED STATES PATENTS 2,721,827   Gustus _____ Oct. 25, 1955

FOREIGN PATENTS 522,346   Belgium _____ Sept. 15, 1953

OTHER REFERENCES

Thoren: Stanford Med. Bull., November 1952, pp. 316–318.

Szybalski: Amer. Rev. of Tuberculosis, June 1952, pp. 768–770.

Indian Med. Gazette Adv., February 1953, p. 7 (Adv.).

Schwartz et al.: Transactions, 12th Conf. on Chemotherapy of TB, February 1953, pp. 296–298.

JAMA, vol. 154, No. 1, Jan. 2, 1954, pp. 52–59.

Rubin: Annals Int. Med., vol. 40, No. 3, March 1954, pp. 493–500.

Hughes: J. Pharmacol. and Expl. Ther., vol. 109, December 1953, pp. 444–452.